L. W. CHUBB.
DEVICE FOR PRODUCING POLAR OSCILLOGRAMS.
APPLICATION FILED OCT. 6, 1916.
Reissued Mar. 23, 1920. 14,821.
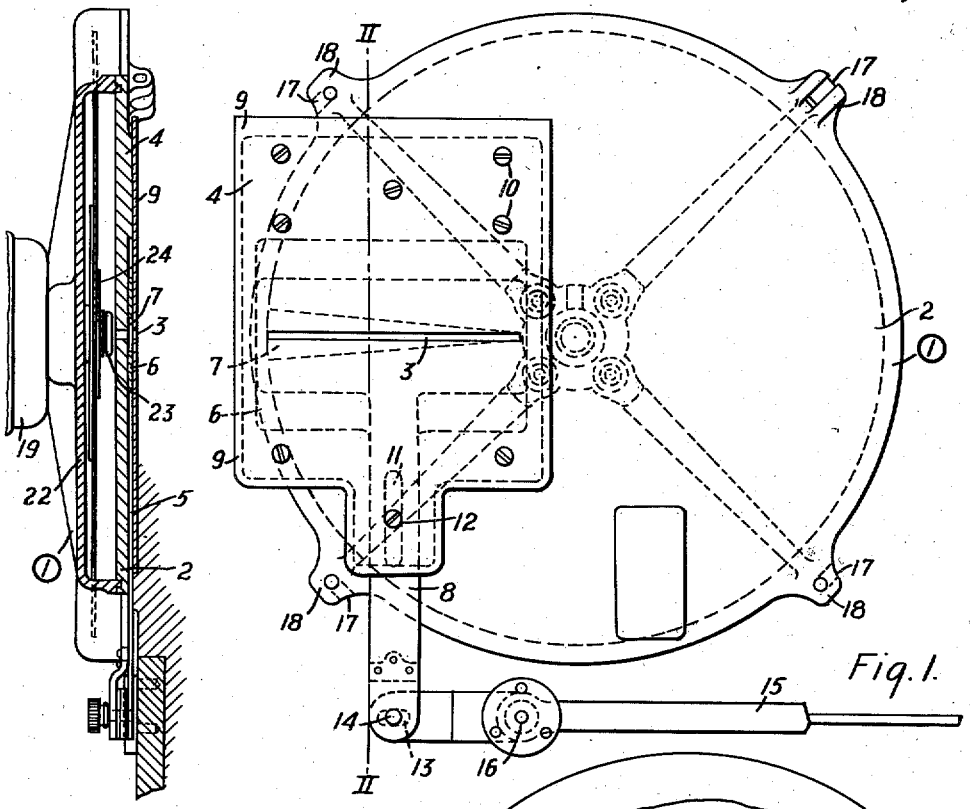
Fig. 1.
Fig. 2.
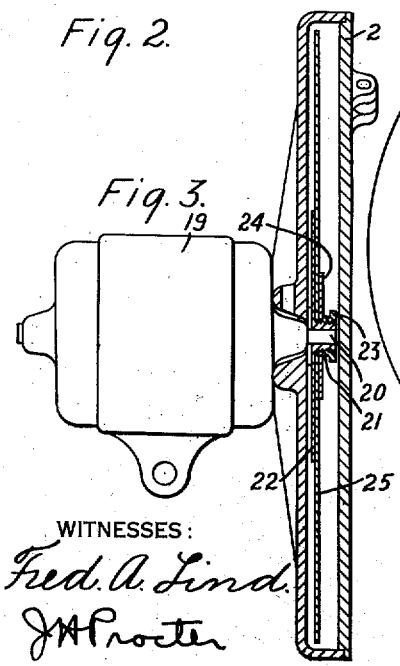
Fig. 3.
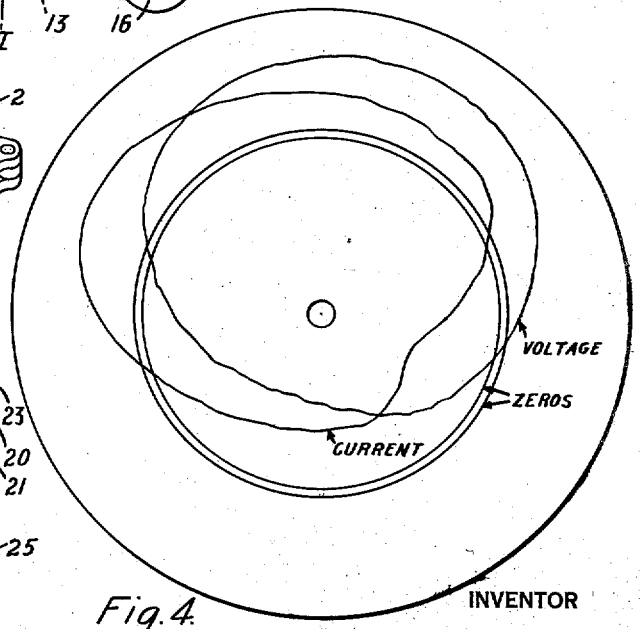
Fig. 4.
WITNESSES:
Fred. A. Lind.
J. A. Procter
INVENTOR
Lewis W. Chubb
BY
Merle G. Carr
ATTORNEY

UNITED STATES PATENT OFFICE.

LEWIS W. CHUBB, OF EDGEWOOD PARK, PENNSYLVANIA, ASSIGNOR TO WESTINGHOUSE ELECTRIC AND MANUFACTURING COMPANY, A CORPORATION OF PENNSYLVANIA.

DEVICE FOR PRODUCING POLAR OSCILLOGRAMS.

14,821. Specification of Reissued Letters Patent. Reissued Mar. 23, 1920.

Original No. 1,175,338, dated March 14, 1916, Serial No. 809,795, filed December 31, 1913. Application for reissue filed October 6, 1916. Serial No. 124,193.

*To all whom it may concern:*

Be it known that I, LEWIS W. CHUBB, a citizen of the United States, and a resident of Edgewood Park, in the county of Allegheny and State of Pennsylvania, have invented a new and useful Improvement in Devices for Producing Polar Oscillograms, of which the following is a specification.

My invention relates to oscillographic devices and particularly to devices for making photographic records having polar or circular coördinates.

The object of my invention is to provide a device for photographing a reflected ray of light from an oscillograph upon a sensitized circular plate or film.

Heretofore, oscillographs have been provided with films or falling plates which passed in front of shutters at definite speeds to expose them to the reflected rays of light from galvanometers for producing curves having rectangular coördinates. In many cases, as when analyzing the waves for harmonics and when computing the power represented by curves, it is desirable to convert the curves represented by rectangular coördinates into curves having circular or polar coördinates. This replotting of the curves requires considerable time, and serious errors are possible by reason of mistakes made in transferring the figures. To overcome the aforesaid difficulties, I provide a means for photographing rays of light in polar or circular coördinates, as hereinafter described.

Figure 1 of the accompanying drawings is a front elevational view of a photographic device embodying my invention. Fig. 2 is a section taken along the line II—II of Fig. 1. Fig. 3 is a side view, partially in elevation and partially in section, of the device shown in Fig. 1, and a driving motor connected thereto, and Fig. 4 is a specimen curve sheet made with the apparatus embodying my invention.

A hollow ribbed receptacle 1, having a cover 2 with a slit 3 therein, is arranged to fit any well known type of oscillograph (not shown). The cover 2 has a substantially rectangular raised portion 4 which projects over the edge of the same and has a recess 5 therein in which operates a shutter 6 having a tapered slit 7 in a handle 8 attached to its lower end. The shutter 6 is maintained in the recess 5 by a plate 9 which is attached to the raised portion 4 of the cover member 2 by a plurality of screws 10. The plate 9 is slightly wider than the raised portion 4 of the cover 2 so that it may be slipped in the grooves (not shown) usually provided on an oscillograph for that purpose. The handle 8 of the shutter has a vertical slot 11 to receive a screw 12, and a horizontal slot 13 to receive a pin 14 that is attached to one end of a lever 15 having a pivotal support upon a pin 16. The receptacle 1 is provided with a plurality of projections 17, and the cover 2 is provided with an equal number of projections 18 which coöperate to fasten the cover 2 and the receptacle 1 together.

A synchronous motor 19 having a shaft 20 is attached to the receptacle 1 by any suitable means. The shaft 20 projects into the receptacle 1 and has attached thereto, near its end, a sleeve 21 upon which is mounted a supporting plate 22. The sleeve 21 is threaded to receive a nut 23 which presses a washer 24 against a circular sensitive film or plate 25.

As is known by those versed in the art, an oscillograph is essentially a galvanometer the vibrations of which are synchronously reflected upon a sensitized plate or film to reproduce a curve which is a picture of the performance of the voltage or current under consideration. Hence, no further description of an oscillograph is deemed necessary for a clear understanding of my invention.

A circular film 25 is inserted in the circular receptacle or casing 1 on the shaft 20 and the cover 2 is securely clamped in place in a dark room. The device is then attached to an oscillograph (not shown) by inserting the plate 9 behind the usual slots provided on an oscillograph for that purpose. The usual oscillograph has a slit in it which corresponds to the slit 3 in the cover 2 so that a ray of light from the oscillograph (not shown) may be transmitted to the film 25. The motor 19 is started and runs at synchronous speed. When synchronism is reached, the lever 15 is depressed, thus moving the shutter 6 upwardly and exposing the film 25 to a rapidly vibrating ray of reflected light. Usually a base line or zero circle is drawn on the film by a subsequent exposure.

with the element or galvanometer of the oscillograph so disconnected that it does not vibrate. This will produce a perfect circle upon the sensitized plate.

In Fig. 4 of the drawings are shown two curves, one representing the current taken by a 5 kilovolt ampere transformer and the other the voltage of the same, while the zero line for each is given.

The device is particularly adaptable to photographing periodic waves, and the shutter need remain open only sufficient time to equally expose the entire film. Since the film is rotated in synchronism with the periodic wave, the time of exposure depends only upon the time required to equally expose the whole film. The device may be adapted for photographing transient or non-periodic waves if the opening in the shutter is made rectangular in form.

The slit 7 in the shutter 6 is tapered to equalize the time of exposure of the different points on the disk film. That is, the slit 7 is so shaped that, when the slit 3 is opened by moving the shutter 6 the outer portions of the disk 25 receive the light before the inner portions, and when the slit 3 is closed, the outer portions receive the light longer than the inner portions, thus compensating, in a certain manner, for the difference in peripheral speed of the various portions of the disk. Should it be desired to photograph a true polar curve with its zero at a point, the slit may be extended to the center of the cover 2, as will be readily understood by those versed in the art. The motor 19 may be of any type but it must be operated in synchronism with the circuits the curves of which are being photographed.

While I have described my invention in its preferred form, structural modifications may be made without departing from the scope of the same as defined in the appended claims.

I claim as my invention:

1. In a device for producing oscillograms, the combination with a light-proof receptacle, of means for supporting a sensitized member and for rotating the member at a substantially constant speed, and means for equally exposing all parts of the sensitized member.

2. In a device for producing polar oscillograms, the combination with a light-proof receptacle, of means for rotating a sensitized film at a predetermined speed, and means for exposing substantially all portions of the said film for equal lengths of time.

3. In a device for producing polar oscillograms, the combination with a light-proof receptacle, of means for rotating a sensitized film at a predetermined speed, means for attaching the said device operatively to an oscillograph, and means for equally exposing various portions of the said film.

4. A device for producing polar oscillograms, comprising a light-proof receptacle having a slit therein, means for rotating a sensitized film contained therein at a predetermined speed, and a shutter having a triangular shaped slit therein that coöperates with the slit in the receptacle to expose each point of the sensitized film for an equal length of time.

5. A device for producing polar oscillograms comprising a light-proof receptacle having a slit therein, means for rotating a sensitized film contained therein, a shutter having a triangular shaped slit therein for coöperating with the slit to expose each point of a sensitized film an equal length of time and means for operating the said shutter.

6. In a device for producing polar oscillograms, the combination with a light-proof receptacle having a slit therein, of a shutter having a triangular shaped slit therein for equally exposing each point of a sensitized film, means for operating the said shutter, and a motor for rotating and supporting the film.

7. A device for producing circular oscillograms comprising a light-proof receptacle having a rectangular shaped slit therein, a shutter having a triangular shaped slit therein to coöperate with the rectangular shaped slit for exposing all parts of a sensitized film equal lengths of time, and means for rotating the sensitized film at a substantially constant speed.

8. A device for producing oscillograms comprising means for rotating a sensitized circular member at a predetermined constant speed and means for equally exposing each portion of the said member.

9. A camera comprising a light-proof receptacle, having a rectangular shaped slit therein, a shutter having a triangular shaped slit that coöperates with the rectangular shaped slit to equally expose all parts of a sensitized film in the light-proof receptacle and means for rotating said film at a substantially constant speed.

10. A camera comprising a circular light-proof receptacle having a rectangular slit extending along one of its radii, a shutter having a slit therein for coöperating with the slit in the light-proof receptacle for equally exposing all parts of a sensitized film contained in the light-proof receptacle and a motor for rotating the said film at a predetermined constant speed.

11. A camera comprising a circular light-proof receptacle having a rectangular slit extending along one of its radii, a shutter having a triangular shaped slit therein for coöperating with the slit in the light-proof receptacle for equally exposing all parts of a sensitized film contained in the light-proof receptacle and a motor for supporting and rotating the film.

12. A camera comprising a circular base having a cavity therein, a cover for the cavity having a slit therein and means for securing the same to the base, a shutter for coöperating with the slit in the cover for equally exposing all parts of a sensitized film and means for rotating said film at a predetermined speed.

13. A device for producing oscillograms comprising means for rotating a sensitized circular member at a predetermined constant speed and means for so exposing each portion of the said member that a continuous closed curve having polar coördinates may be photographed.

14. A camera comprising a circular light-proof receptacle having a slit extending along one of its radii, a shutter having a slit therein for coöperating with the slit in the light-proof receptacle for exposing all parts of a sensitized circular member, and means for rotating the said sensitized member at a predetermined constant speed.

15. In a photographic device, the combination with a light-proof receptacle having a slit therein, of a shutter having a slit therein for coöperating with the slit in the receptacle to expose all parts of a sensitized circular film, means for operating the said shutter, and means for rotating and supporting the said film.

16. In a photographic device, the combination with a light-proof receptacle, of means for rotating a sensitized circular member at a predetermined speed, and means for so exposing the said sensitized member that a continuous closed picture may be obtained.

17. The combination with a light-proof receptacle, of means for rotating a substantially circular sensitized member therein, and means for so exposing substantially all parts of the sensitized member that a continuous closed photographic record may be produced.

18. A photographic device comprising means for rotating a sensitized circular member at a predetermined speed and means for so exposing each portion of the said member that a curve which closes on itself may be obtained.

19. A photographic device comprising means for rotating a sensitized circular member at a predetermined speed and means for so exposing the said member that a record which closes on itself may be obtained.

20. In a device for producing oscillograms, the combination with a light-proof receptacle, of means for supporting a sensitized circular member and for rotating the same at a substantially constant speed, and means for so exposing the said sensitized member that a continuous closed record is produced.

In testimony whereof, I have hereunto subscribed my name this 26th day of Sept., 1916.

LEWIS W. CHUBB.